United States Patent
Wu et al.

[19]

[11] Patent Number: 5,934,774
[45] Date of Patent: Aug. 10, 1999

[54] CHASSIS COVER WITH A STABILIZING STAND

[75] Inventors: Thomas Gordon Wu, Monterey Park; Robert Dennis Brunner, Los Gatos; Tina Zimmerman, San Francisco; Sung Hoon Kim, Palo Alto, all of Calif.

[73] Assignee: Toshiba America Information System, Inc., Irvine, Calif.

[21] Appl. No.: 09/031,110

[22] Filed: Feb. 26, 1998

[51] Int. Cl.⁶ ................................................. F16M 11/00
[52] U.S. Cl. ................................ 312/223.2; 312/351.9; 248/425; 248/688; 248/918
[58] Field of Search ............................. 312/351.9, 223.2, 312/326; 248/688, 918, 349.1, 425

[56] References Cited

U.S. PATENT DOCUMENTS

| | | |
|---|---|---|
| D. 33,021 | 10/1900 | Kline et al. . |
| D. 313,015 | 12/1990 | Ryan et al. . |
| 3,908,942 | 9/1975 | Keith et al. . |
| 4,635,811 | 1/1987 | Lodi . |
| 4,872,733 | 10/1989 | Tedham et al. . |
| 5,020,768 | 6/1991 | Hardt et al. . |
| 5,024,414 | 6/1991 | Drain ........................................ 248/688 |
| 5,388,792 | 2/1995 | Hastings et al. . |
| 5,601,541 | 2/1997 | Swisher ............................. 312/351.9 X |
| 5,688,030 | 11/1997 | McAnally et al. . |
| 5,749,637 | 5/1998 | McMahan et al. ................... 312/223.2 |
| 5,794,913 | 8/1998 | Ho .......................................... 248/688 |

*Primary Examiner*—Peter M. Cuomo
*Assistant Examiner*—Hanh V. Tran
*Attorney, Agent, or Firm*—Pillsbury Madison & Sutro LLP

[57] ABSTRACT

A chassis cover of a host unit, which has a horizontal orientation and a vertical orientation, includes a side cover and a stabilizing stand. The side cover has outer peripheral edges and a cavity. The stand is movable between a closed position and an open position and is coupled to the side cover. The stand fits within the cavity in the side cover to form a substantially contiguous surface when the host unit is in the horizontal orientation and the stand is in the closed position. The stand projects beyond the outer peripheral edges of the side cover in a direction transverse to the depth of the host unit to stabilize the host unit in the vertical orientation resting on the side cover when the stand is in the open position.

9 Claims, 6 Drawing Sheets

CHASSIS COVER WITH A STABILIZING STAND

BACKGROUND

1. Field of the Invention

This invention relates to computer chassis covers, and, in particular embodiments, a chassis cover of a host unit with a stabilizing stand that enables convenient positioning of the host unit in either a horizontal orientation or a vertical orientation.

2. Related Art

Traditionally, a host unit of a computer system includes a keyboard placed in front of the host unit and a monitor placed on top of the host unit. Unfortunately, such a configuration occupies a considerable amount of desk space. In an effort to minimize the amount of desk space required for a computer system, users have been standing the host unit in a vertical orientation on the floor. However, the host units in the vertical orientation (host units of a slim-line design in particular) are not stable and vulnerable to tipping over.

To overcome this drawback, tower units have been developed. The tower unit is specifically designed to stand vertically on the desk or floor. However, a user cannot place the tower unit in a horizontal orientation, if so desired. In addition, host units with stabilizing supports have been produced. The stabilizing support enables the placement of and stabilizes the host unit in the vertical orientation. However, the stabilizing support, particularly for slim-line chassis designs, protrudes from the host unit, thus making it difficult to place the host unit in a horizontal orientation, if so desired. Neither the tower unit nor the host unit with the stabilizing support are capable of convenient positioning in either the horizontal orientation or the vertical orientation, in accordance with the user's desire.

SUMMARY

An object of an embodiment of the present invention is to provide a chassis cover of a host unit that enables convenient positioning of the host unit in either a horizontal orientation or a vertical orientation.

Another object of an embodiment of the present invention is to provide a chassis cover of a host unit that maintains streamlined surfaces when the host unit is in a horizontal orientation and that allows placement of and stabilizes the host unit in a vertical orientation.

An embodiment of the present invention is directed to a chassis cover of a host unit having a horizontal orientation and a vertical orientation. The chassis cover includes a side cover and a stabilizing stand. The side cover has outer peripheral edges and a cavity. The stabilizing stand is movable between a closed position and an open position and is coupled to the side cover. The stand fits within the cavity in the side cover to form a substantially continguous surface when the host unit is in the horizontal orientation and the stand is in the closed position. The stand projects beyond the outer peripheral edges of the side cover in a direction transverse to the depth of the host unit to stabilize the host unit in the vertical orientation resting on the side cover when the stand is in the open position.

When the stand is in the closed position, the stand fits within the cavity in the side cover of the chassis cover to form a substantially continguous surface with the side cover. Thus, the chassis cover maintains streamlined surfaces and the host unit has no protruding parts when the host unit is in the horizontal orientation. When the stand is in the open position, the stand projects beyond the outer peripheral edges of the side cover in a direction transverse to the depth of the host unit. Thus, the stand stabilizes the host unit in the vertical orientation while resting on the side cover.

Other features and advantages of the invention will become apparent from the following detailed description, taken in conjunction with the accompanying drawings which illustrate, by way of example, various features of embodiments of the invention.

BRIEF DESCRIPTION OF THE DRAWINGS

A detailed description of embodiments of the invention will be made with reference to the accompanying drawings, wherein like numerals designate corresponding parts in the several FIGURES.

DETAILED DESCRIPTION OF THE PREFERRED EMBODIMENTS

Figure 1:
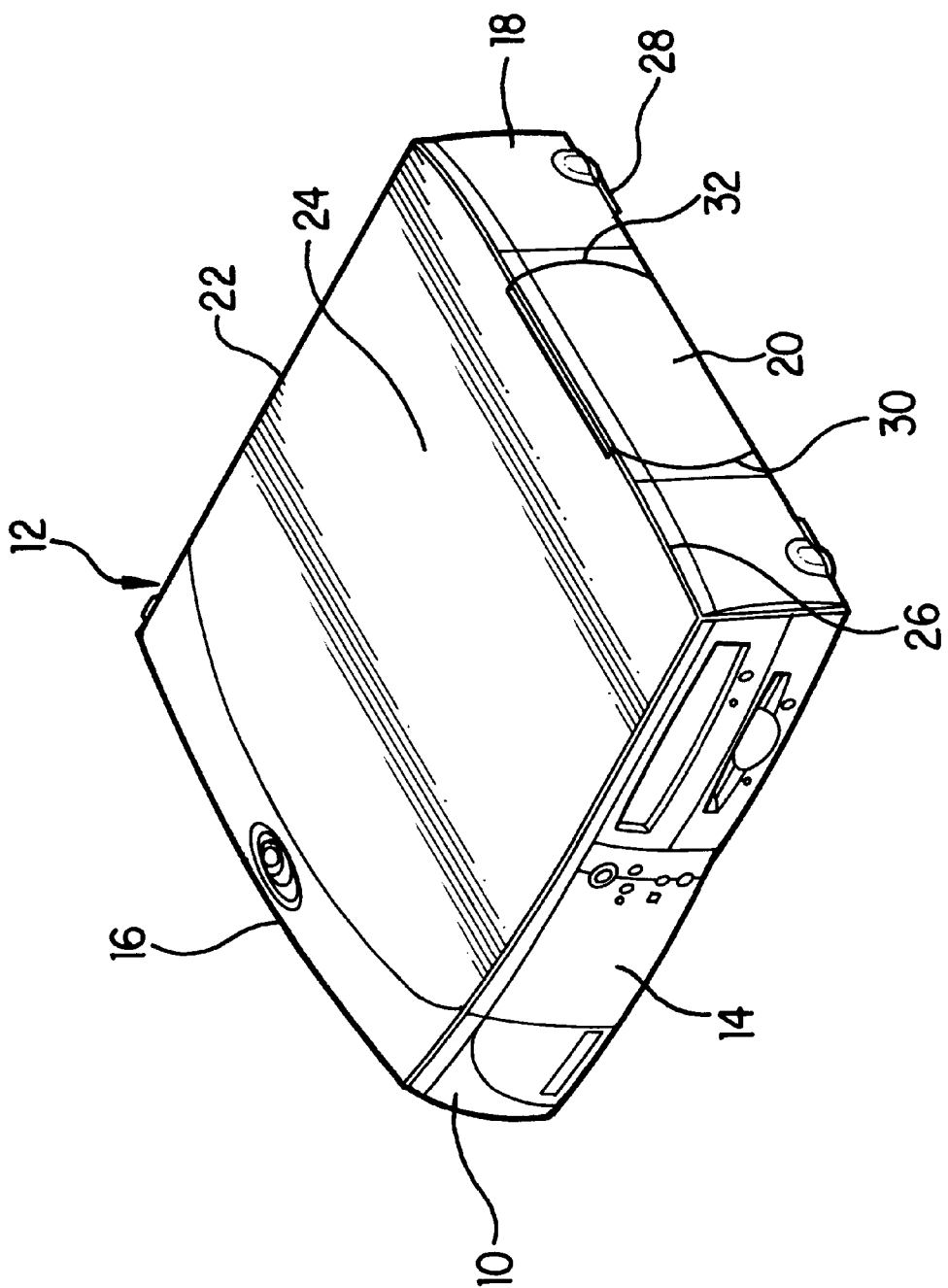
FIG. 1 shows a perspective view of a chassis cover of a host unit in a horizontal orientation with a stabilizing stand in a closed position in accordance with an embodiment of the present invention.

As shown in the drawings for purposes of illustration, an embodiment of the present invention includes a chassis cover of a host unit with a stabilizing stand. In preferred embodiments of the present invention, the chassis cover includes a stand that maintains streamlined surfaces when the host unit is in a horizontal orientation and the stand is in a closed position, and that stabilizes the host unit in a vertical orientation resting on a side cover when the stand is in an open position. However, in alternative embodiments, the chassis cover may include a plurality of stands that maintain streamlined surfaces when the host unit is in the horizontal orientation and the stands are in the closed position, and that stabilize the host unit in the vertical orientation resting on the side cover when the stands are in the open position.

Figure 2:
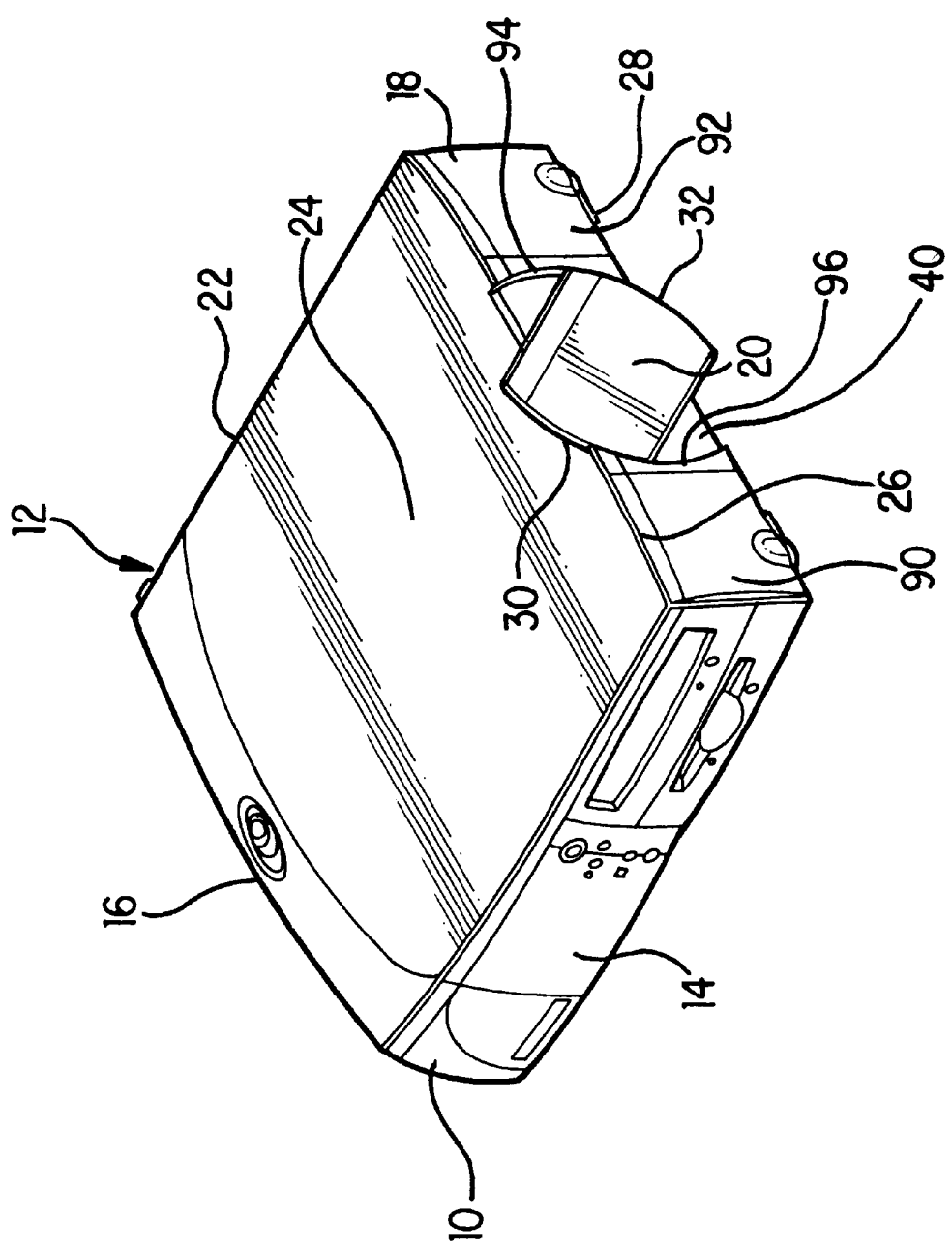
FIG. 2 shows a perspective view of the chassis cover of the host unit in the horizontal orientation with the stabilizing stand between the closed position and an open position in accordance with an embodiment of the present invention.
Figure 3:
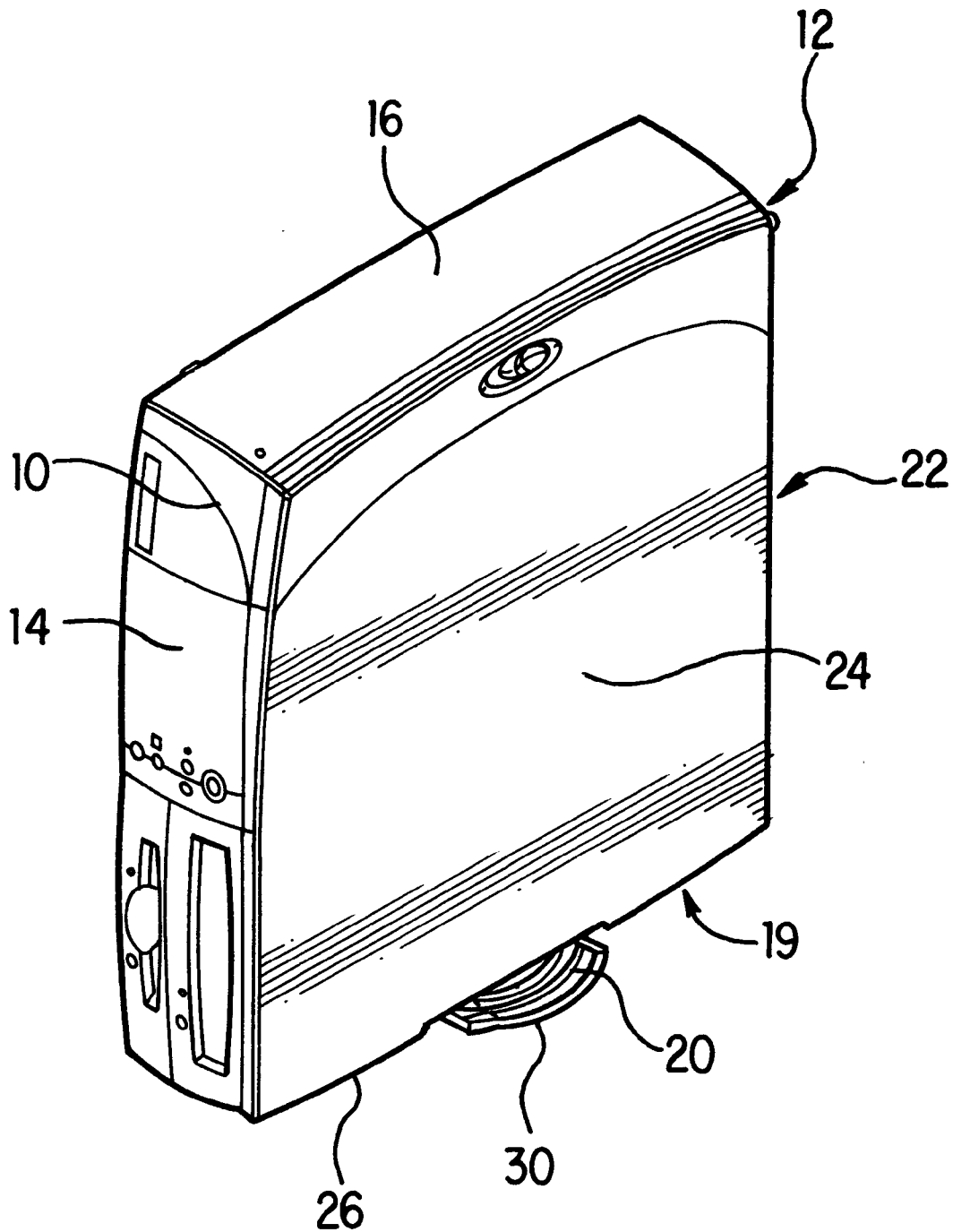
FIG. 3 shows a perspective view of the chassis cover of the host unit in a vertical orientation resting on a side cover of the chassis cover with the stabilizing stand in the open position in accordance with an embodiment of the present invention.

FIGS. 1 through 3 illustrate views of a chassis cover 24 of a host unit with a stabilizing stand 20 in accordance with an embodiment of the present invention. The chassis cover 24 typically encloses a metal chassis (not shown) to which components (not shown) are attached. The chassis may be of the type set forth in the NLX standard promulgated by Intel Corporation. The components attached to the chassis may include a motherboard, media drives, a power supply and fan, and expansion boards. A cathode ray tube display monitor and peripheral devices are also typically attached to the host unit.

According to an embodiment, the chassis cover 24 is formed from injection molded plastic in a manner known to those of ordinary skill in the art. The stand 20 is also preferably formed from an injection molding process separately from the chassis cover 24. In alternative embodiments, the chassis cover 24 and the stand 20 may be made of other suitable materials, such as ceramic, metal, composites, or the like.

In the embodiment illustrated in FIGS. 1 through 3, the chassis cover 24 includes a front bezel 14 oriented to face a user when the host unit is in the horizontal orientation, a door 10, a right cover 18, and a chassis cover 24. The chassis cover 24 may further include a rear wall 22.

Figure 4A:
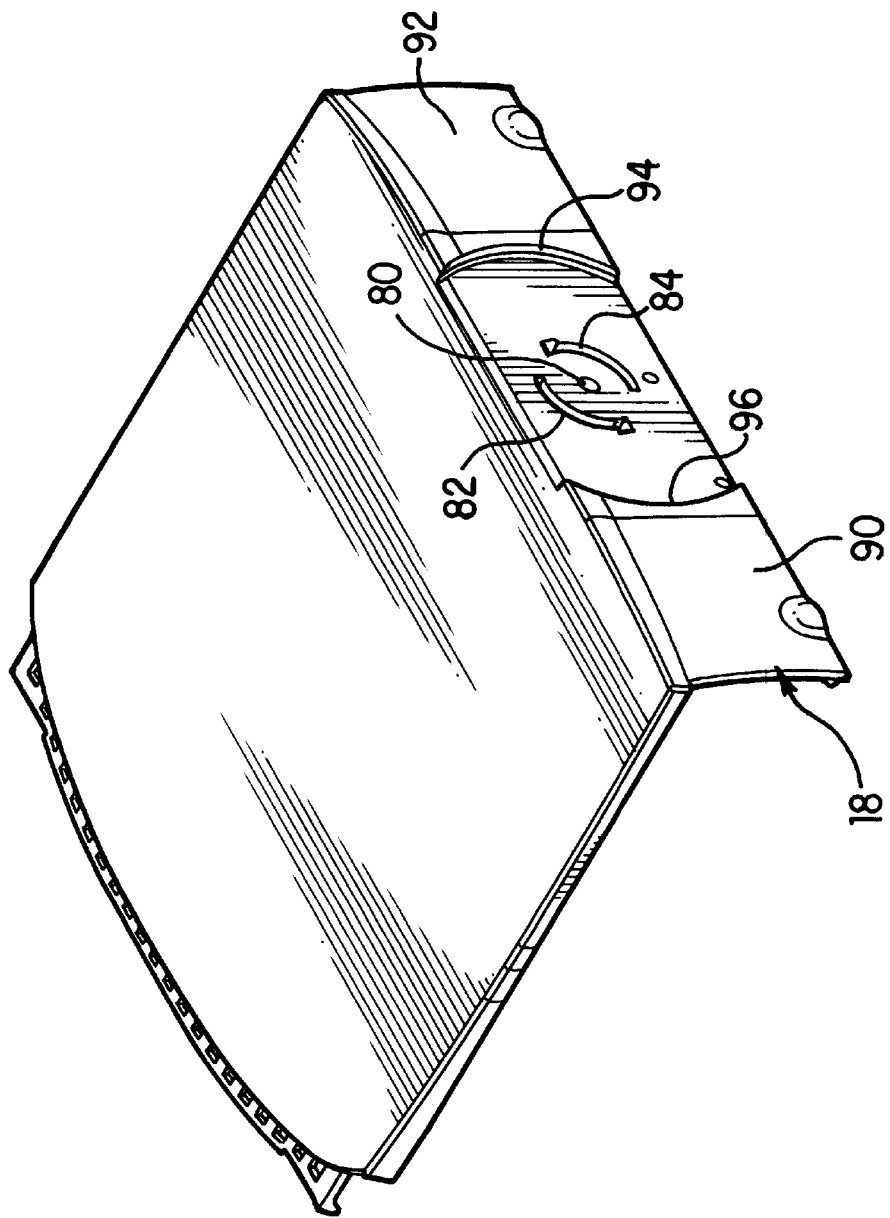
FIG. 4a shows a perspective view of a surface of the chassis cover in accordance with an embodiment of the present invention.
Figure 4B:
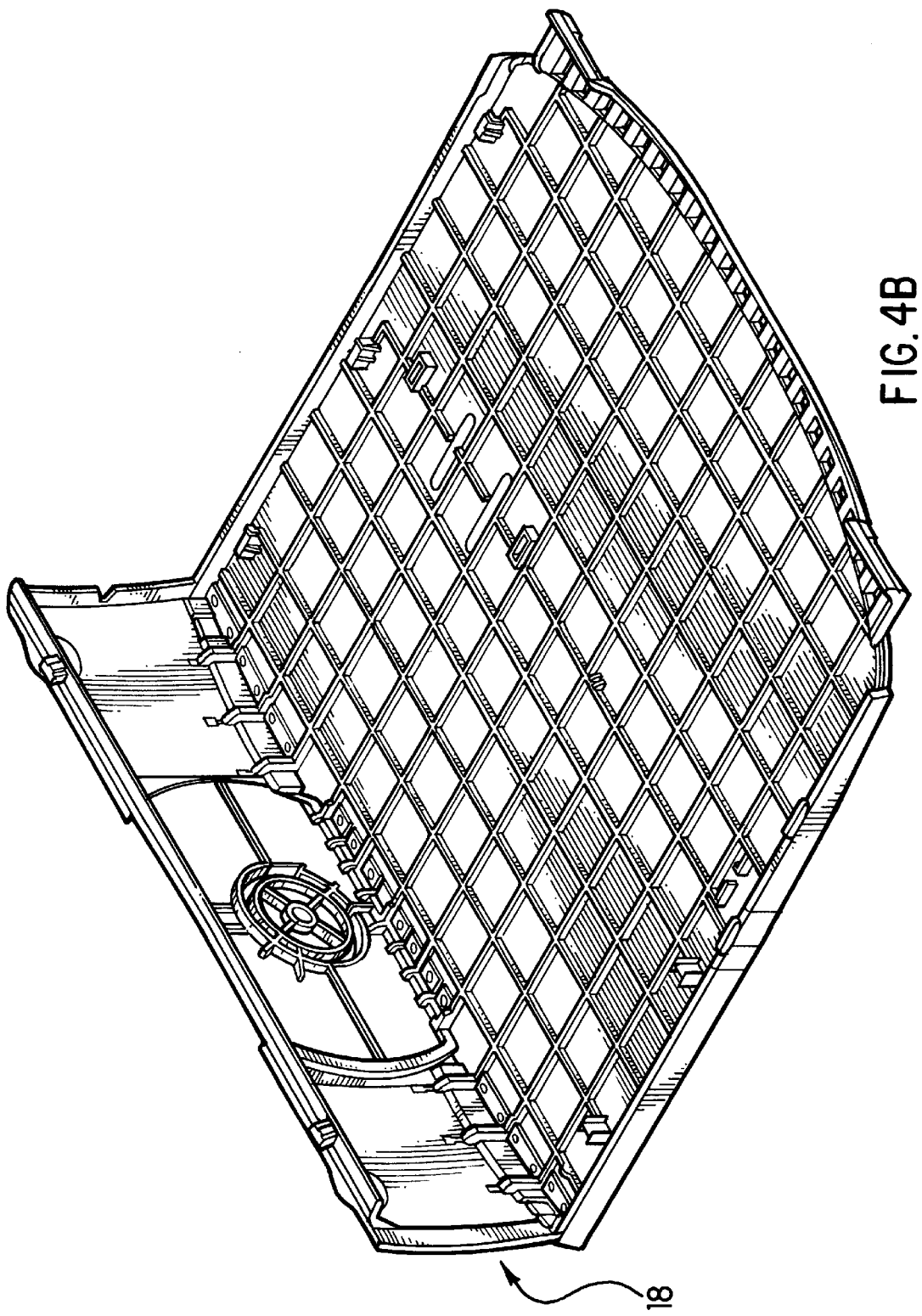
FIG. 4b shows a perspective view of an interior surface of the chassis cover.
Figure 5A:
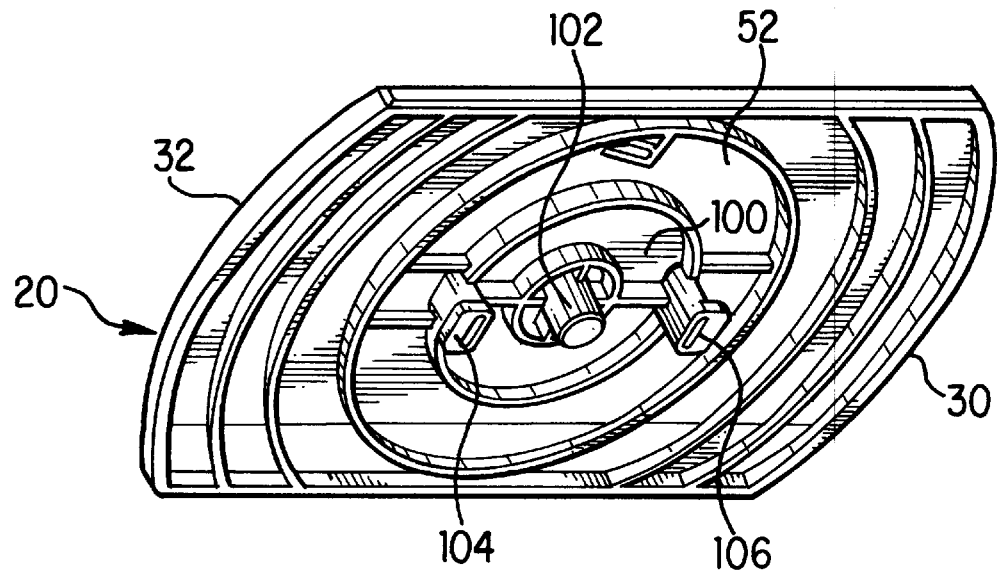
FIG. 5a shows a perspective view of an inner surface of the stabilizing stand in accordance with an embodiment of the present invention.
Figure 5B:
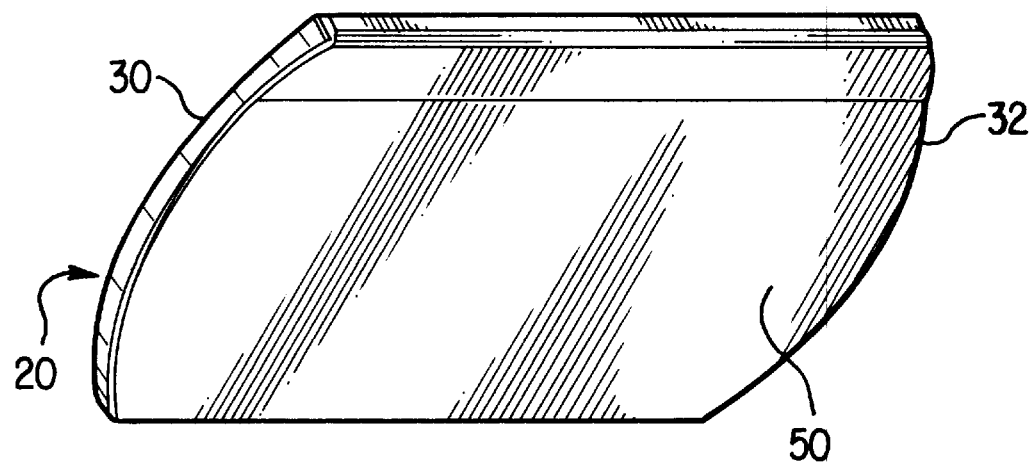
FIG. 5b shows a perspective view of an outer surface of the stand.

Referring to FIGS. 1 through 3 and 4a, the right cover 18 has outer peripheral edges 26 and 28, and a cavity 40. As shown in FIGS. 2 and 4a, the right cover 18 also includes exterior surfaces 90 and 92 raised above the cavity 40. Referring to FIGS. 5a and 5b, the stand 20 is a substantially flat panel, preferably with curved edges 30 and 32 at opposite ends and a thickness between an outer surface 50 and an inner surface 52. Referring to FIGS. 2 and 4a, the cavity 40 preferably has a depth of about equal to the thickness of the stand 20. The cavity 40 also includes sides 94 and 96 that are preferably curved to conform with the edges 30 and 32 of the stand 20. As shown in FIG. 1, when the stand 20 is in the closed position, the stand 20 fits within and substantially conforms to the shape of the cavity 40 such that the outer surface 50 of the stand 20 fits flush and substantially conforms with the exterior surfaces 90 and 92 of the right cover 18, preferably with only enough spacing between the edges 30 and 32 of the stand 20 and the exterior surfaces 90 and 92 of the right cover 18 to provide proper clearance of the stand 20 for movement between a closed position and an open position. The stand 20 thus forms a substantially contiguous surface with the exterior surfaces 90 and 92 of the right cover 18. In alternative embodiments, the left wall 16 may have the cavity 40, and the stand 20 may fit within the cavity 40 in the left wall 16.

In the embodiment illustrated in FIG. 4a, the cavity 40 includes a circular hole 80 at about the midpoint of the cavity 40. The cavity 40 also includes two curved grooves 82 and 84. FIG. 5a illustrates an inner surface of the stand 20, which has a structural rib. In the illustrated embodiment, the structural rib on the inner surface of the stand 20 is a cylindrical rib 100 that includes a head 102 at about the midpoint of the cylindrical rib 100 and two tabs 104 and 106. In alternative embodiments, the structural rib on the inner surface of the stand 20 may have other shapes, such as a circular rib or the like. In the embodiment illustrated in FIGS. 1 through 3, 4a, and 5a, the head 102 of the cylindrical rib 100 fits and moves within the circular hole 80 of the cavity 40, and the tabs 104 and 106 of the cylindrical rib 100 fit and move within the curved grooves 82 and 84 of the cavity 40, such that the stand 20 is coupled to the right wall 18 and is movable between a closed position and an open position. In alternative embodiments, the stand 20 may be coupled to the right wall 18 with fasteners, such as rivets, screws, or the like. According to one embodiment, the stand 20 rotates about the head 102 between the closed position and the open position. Accordingly, the shape of the edges 30 and 32 of the stand 20 and the corresponding sides 94 and 96 of the cavity 40 are preferably portions of a circle centered about the head 102. In alternative embodiments, the stand 20 and the cavity 40 may have other shapes, such as a semicircle or the like.

FIGS. 1 through 3 illustrate views of the chassis cover 24 of the host unit with the stand 20 in different positions. FIG. 1 shows the stand 20 in the closed position. In the closed position, the stand 20 fits within, and substantially conforms to the shape of, the cavity 40 such that the stand 20 forms a substantially contiguous surface with the right wall 18. The chassis cover 12 thus maintains streamlined surfaces when the host unit in a horizontal orientation and does not require support from the stand 20.

FIG. 2 illustrates the stand 20 positioned between the closed position and the open position. In one embodiment, the stand 20 is rotated clockwise between the closed position and the open position. However, in alternative embodiments, the stand 20 may be rotated counterclockwise between the closed position and the open position.

FIG. 3 shows the host unit in a vertical orientation resting on the right cover 18 with the stand 20 in the open position. In the open position, the stand 20 projects beyond the outer peripheral edges 26 and 28 of the right wall 18 in a direction transverse to the depth of the host unit to stabilize the host unit in the vertical orientation resting on the right cover 18.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A chassis cover of a host unit, the host unit having a horizontal orientation and a vertical orientation, the chassis cover comprising:

a side cover having outer peripheral edges and a cavity; and a one-piece stabilizing stand rotatable between a closed position and an open position and coupled to the side cover, wherein the stand fits within the cavity in the side cover to form a substantially contiguous surface with the side cover when the stand is in the closed position, and the stand projects beyond the outer peripheral edges of the side cover in a direction transverse to the depth of the host unit to stabilize the host unit in the vertical orientation resting on the side cover when the stand is in the open position.

2. The chassis cover of claim 1, wherein the cavity in the side cover further includes a hole and a plurality of grooves and the stand includes a plurality of cylindrical ribs on an inner surface facing the cavity, wherein the cylindrical ribs fit and move within the hole and the plurality of grooves in the cavity such that the stand is coupled to the side cover and is rotated between the closed position and the open position.

3. The chassis cover of claim 1, wherein the stand is rotatable between the closed position and the open position.

4. The chassis cover of claim 1, wherein the stand is coupled to the side cover at about the midpoint of the side cover.

5. The chassis cover of claim 1, wherein when the host unit is in the horizontal orientation, the chassis cover includes a front bezel oriented to face a user, and a left wall and a right cover with respect to the user, and wherein the side cover is the right cover.

6. A stabilizing stand for a chassis cover of a host unit, wherein the chassis cover has a side cover with a cavity, and the cavity has a hole and a plurality of grooves, the stand comprising:

a substantially flat panel having curved edges at opposite ends, wherein the panel is adapted to fit within and substantially conform to the shape of the cavity such that the panel forms a substantially contiguous surface with the side cover; and a plurality of cylindrical ribs on the inner surface of the panel facing the cavity, wherein the cylindrical ribs are adapted to fit and move within the hole and the plurality of grooves in the cavity such that the stand is coupled to the side cover and is rotated between a closed position and an open position.

7. A method of manufacturing a chassis cover of a host unit, the host unit having a horizontal orientation and a vertical orientation, the method comprising the steps of:

forming a side cover of the chassis cover having outer peripheral edges and a cavity;

forming a one-piece stabilizing stand rotatable between a closed position and an open position, wherein the stand fits within the cavity in the side cover to form a substantially contiguous surface with the side cover when the stand is in the closed position, and the stand projects beyond the outer peripheral edges of the side cover in a direction transverse to the depth of the host unit to stabilize the host unit in the vertical orientation resting on the side cover when the stand is in the open position; and coupling the stand to the side cover.

8. The method of manufacturing the chassis cover of claim 7, the method further comprising the steps of:

forming a hole and a plurality of grooves in the cavity of the side cover;

forming a plurality of cylindrical ribs on an inner surface of the stand; and coupling the cylindrical ribs to the hole and the plurality of grooves in the cavity, wherein the cylindrical ribs fit and move within the hole and the plurality of grooves in the cavity such that the stand is coupled to the side cover and is rotatable between the closed position and the open position.

9. A method of manufacturing a one-piece stabilizing stand for a chassis cover of a host unit, wherein the chassis cover has a side cover with a cavity, and the cavity has a hole and a plurality of grooves, the method comprising the steps of:

forming a substantially flat panel having curved edges at opposite ends, wherein the panel is adapted to fit within and substantially conform to the shape of the cavity such that the panel forms a substantially contiguous surface with the side cover; and forming a plurality of cylindrical ribs on the inner surface of the panel facing the cavity, wherein the cylindrical ribs are adapted to fit and move within the hole and the plurality of grooves in the cavity such that the stand is coupled to the side cover and is rotated between a closed position and an open position.

* * * * *